United States Patent
Toyoda et al.

(10) Patent No.: US 12,535,234 B2
(45) Date of Patent: Jan. 27, 2026

(54) AIR STERILIZATION APPARATUS AND AIR CONDITIONER USING SAME

(71) Applicant: Hitachi, Ltd., Tokyo (JP)

(72) Inventors: Hiroyuki Toyoda, Tokyo (JP); Daisuke Akimaru, Tokyo (JP); Akinori Kawasaki, Tokyo (JP); Tomoaki Taguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 534 days.

(21) Appl. No.: 18/015,641

(22) PCT Filed: Nov. 10, 2021

(86) PCT No.: PCT/JP2021/041275
§ 371 (c)(1),
(2) Date: Jan. 11, 2023

(87) PCT Pub. No.: WO2023/084626
PCT Pub. Date: May 19, 2023

(65) Prior Publication Data
US 2024/0240817 A1 Jul. 18, 2024

(51) Int. Cl.
*F24F 8/22* (2021.01)
(52) U.S. Cl.
CPC ........................... *F24F 8/22* (2021.01)
(58) Field of Classification Search
CPC .......... F24F 8/22; A61L 2209/16; A61L 9/20; Y02A 50/20
See application file for complete search history.

(56) References Cited

U.S. PATENT DOCUMENTS

| 2012/0085927 A1 | 4/2012 | Maeng et al. |
| 2016/0271288 A1* | 9/2016 | Davis .................. A61M 16/107 |

(Continued)

FOREIGN PATENT DOCUMENTS

| CN | 210612583 U | * | 5/2020 |
| JP | 9-138619 A |   | 5/1997 |

(Continued)

OTHER PUBLICATIONS

English translation of Tong et al. (CN 210612583 U) (Year: 2020).*

(Continued)

*Primary Examiner* — Maris R Kessel
*Assistant Examiner* — Aham Lee
(74) *Attorney, Agent, or Firm* — Crowell & Moring LLP

(57) ABSTRACT

There is provided an air sterilization apparatus that is excellent in applicability to a rectangular duct and can effectively irradiate dust, bacteria, viruses, and the like in circulating air with ultraviolet light while preventing an increase in blowing resistance. The air sterilization apparatus includes a rectangular frame, an ultraviolet light emitting unit, and first reflecting surfaces. The frame includes a pair of first opposite side portions spaced apart from each other in a first direction and extending along a second direction, and a pair of second opposite side portions spaced apart from each other in the second direction and extending along the first direction. A ventilation space is defined inside the frame. The ventilation space allows air to flow therethrough along a third direction substantially orthogonal to the first direction and the second direction. The ultraviolet light emitting unit is provided on at least one of the pair of first opposite side portions, and emits ultraviolet light toward the ventilation space. The first reflecting surfaces are respectively provided on the pair of first opposite side portions so as to face each other. Each first reflecting surface is concave such that a center thereof in the third direction bulges to the outside of the ventilation space. The first reflecting surfaces reflect the ultraviolet light. A length of the ventilation space (Continued)

in the third direction is shorter than a length of the ventilation space in the first direction and a length of the ventilation space in the second direction, and a shape of each first reflecting surface in any cross section perpendicular to the second direction is defined based on an arc having a radius of curvature equal to or larger than a distance between the pair of first reflecting surfaces.

9 Claims, 5 Drawing Sheets

(56) References Cited

U.S. PATENT DOCUMENTS

2018/0356109 A1* 12/2018 Nomura ............... H10H 20/856
2019/0142986 A1*  5/2019 Zhang ..................... C02F 1/325
                                                                250/436

FOREIGN PATENT DOCUMENTS

JP      2004-317085 A      11/2004
JP          6587783 B1    10/2019
WO   WO-2013064154 A1 *   5/2013  ............. B05D 3/067

OTHER PUBLICATIONS

International Search Report (PCT/ISA/210) issued in PCT Application No. PCT/JP2021/041275 dated Dec. 7, 2021 (three (3) pages).

Japanese-language Written Opinion (PCT/ISA/237) issued in PCT Application No. PCT/JP2021/041275 dated Dec. 7, 2021 (three (3) pages).

* cited by examiner

AIR STERILIZATION APPARATUS AND AIR CONDITIONER USING SAME

TECHNICAL FIELD

The present invention relates to an air sterilization apparatus and an air conditioner using the same.

BACKGROUND ART

In an indoor space such as a house, an office, a factory, and a commercial facility, and in an interior of a transportation means such as an airplane, a train, a ship, and a car, most of floating dust, bacteria, viruses, and the like are naturally discharged to the outside by ventilation or the like, but a part thereof stays indoors and in the interior, and may be diffused by circulation of air by an air conditioner. In recent years, due to an increasing interest in new-type infectious diseases and the like that frequently occur, there has been a strong demand for reducing bacteria, viruses, and the like remaining indoors or in the interior more than ever before.

It is known that deep ultraviolet light having a wavelength of 200 nm to 300 nm is effective in sterilizing bacteria and mold, inactivating viruses, and inactivating allergens such as pollen.

For example, PTL 1 discloses a technique of sterilizing (inactivating) bacteria, viruses, and the like in circulating air using ultraviolet light.

CITATION LIST

Patent Literature

PTL 1: JP6587783B

SUMMARY OF INVENTION

Technical Problem

PTL 1 discloses that an ultraviolet light emitting diode (hereinafter abbreviated as an ultraviolet LED) is used as a light source of the ultraviolet light that inactivates bacteria, viruses, and the like. The ultraviolet LED has an advantage that the ultraviolet LED has a relatively long life and is inexpensive, but generally has a disadvantage that intensity of the ultraviolet light emitted from the ultraviolet LED is low.

In order to efficiently inactivate bacteria, viruses, and the like in the air by the ultraviolet light, it is necessary to apply certain ultraviolet power to the bacteria and viruses. An amount of the certain ultraviolet power is determined by the ultraviolet intensity and time during which the bacteria and viruses are exposed to the ultraviolet light. That is, when the ultraviolet intensity in a space is high, the bacteria and viruses are inactivated in a short time, and when the ultraviolet intensity in a space is low, the bacteria and viruses are inactivated as long as ultraviolet irradiation is continuous for a long time. The amount of the ultraviolet power required for inactivation varies depending on a wavelength of the ultraviolet light and the target bacteria and viruses. Here, the amount of the ultraviolet power is expressed by an energy amount joule.

It is possible to provide a composite apparatus capable of implementing a plurality of functions by incorporating, into an air conditioner or an air purifier, an ultraviolet irradiation apparatus that inactivates bacteria, viruses, and the like. In this case, in order to reduce a size of the composite apparatus, a space in an internal duct of the air conditioner or the air purifier can be used as a space for inactivation performed by the ultraviolet irradiation apparatus.

In the air conditioner or the air purifier, bacteria, viruses, and the like to be inactivated are contained in air flowing in the duct. Therefore, when the space where a flow of air is irradiated with the ultraviolet light (inactivation space) is long or a wind speed (flow velocity of air) is small, time during which the bacteria and viruses are exposed to the ultraviolet light is long. In this case, ultraviolet intensity itself in the inactivation space may not be so high. Here, the ultraviolet intensity means an ultraviolet density or an illuminance, and means ultraviolet power per unit area and unit time.

On the other hand, when the space where the flow of air is irradiated with the ultraviolet light (inactivation space) is short or the wind speed is large, the time during which the bacteria and viruses are exposed to the ultraviolet light is short. Therefore, in order to inactivate the bacteria and viruses, it is necessary to sufficiently increase the ultraviolet intensity. In order to create such an inactivation space using the ultraviolet LED, it is necessary to increase the ultraviolet intensity in the space by mounting a plurality of ultraviolet LEDs, and further by providing a reflecting mirror to reflect the ultraviolet light emitted from the ultraviolet LEDs and again irradiate the bacteria and viruses with the reflected ultraviolet light.

A filter, a heat exchanger, a blower, and the like have already been densely disposed in an internal duct of a general air conditioner or air purifier. The ultraviolet irradiation apparatus needs to be designed thin in order to be provided among the components of the internal duct. That is, it is required to shorten the inactivation space for mounting on the air conditioner or the like.

In the general air conditioner or the like, the heat exchanger or the like is generally disposed in a substantially rectangular duct (rectangular duct), and the air conditioner seldom circular duct. Therefore, a shape of the ultraviolet irradiation apparatus suitable for the rectangular duct is more advantageous than a shape suitable for the circular duct in terms of reduction of a mounting cost and blowing resistance.

Meanwhile, most of the current ultraviolet LEDs have a light distribution angle of approximately 100°. Light having a light distribution angle of 100° has a width of 238 mm as traveling 100 mm from a light emitting point. Therefore, in a case where reflecting mirrors are provided on a surface on which the ultraviolet LED is mounted and a facing surface, and a distance between both surfaces is, for example, 100 mm, a part of light emitted from the ultraviolet LED leaks out of the reflecting mirror when a width of the reflecting mirror is smaller than 238 mm. That is, in order to reflect 100% of energy emitted from the LED at least once on the facing surface in a rectangular duct whose inner surfaces are mirror surfaces and whose cross section is a square of 100 mm in length and width, a space of 238 mm is required in an air flow direction (hereinafter, simply referred to as a flow direction in some cases).

However, it is difficult to provide, in the duct on which the components are mounted, an inactivation space having a distance longer than an equivalent diameter of a cross section (cross section substantially perpendicular to the flow direction) of the duct.

As a method for solving this problem, there is a method of combining a plurality of structures in which a distance between an ultraviolet LED and a light reflecting surface thereof is shortened. That is, even in a case of an ultraviolet LED having a light distribution angle of 100°, a length in the flow direction may be 23.8 mm when a distance to a facing surface is, for example, 10 mm. In this method, a plurality of blocks, each of which has an equivalent diameter of 10 mm in flow path h cross section and is formed by combining an ultraviolet LED and a reflecting surface, are arranged to fill the duct.

However, in this method, a thickness of an LED mounting portion is generated for each block. Therefore, when the plurality of blocks are arranged, a thickness thereof causes ventilation resistance, resulting in an increase in blowing resistance.

As another solution, it is conceivable to reduce the light distribution angle of the ultraviolet LED. In other words, when a collimator lens or the like that collimates light of the ultraviolet LED is used, spread of the light is eliminated, whereby the light after passing through the collimator lens can be reflected by 100% without increasing a width. When the light distribution angle is reduced by a condenser lens without being limited to using the collimator lens, and a length in the flow direction can be reduced.

However, when the light of the ultraviolet LED is parallel light or light having a small light distribution angle, the light does not spread in a lateral direction (direction orthogonal to the flow direction), and thus a gap in which the light does not reach may be generated in the rectangular duct. In order to fill the gap, it is necessary to increase a density of the ultraviolet LEDs themselves, which leads to a large increase in cost.

The invention has been made in view of the problems in the related art, and an object thereof is to provide an air sterilization apparatus that is excellent in applicability to a rectangular duct and can effectively irradiate dust, bacteria, viruses, and the like in circulating air with ultraviolet light while preventing an increase in blowing resistance, and an air conditioner using the same.

Solution to Problem

In order to achieve the above object, one representative air sterilization apparatus according to the invention includes:
a rectangular frame including a pair of first opposite side portions spaced apart from each other in a first direction and extending along a second direction, and a pair of second opposite side portions spaced apart from each other in the second direction and extending along the first direction, a ventilation space being defined inside the frame, the ventilation space allowing air to flow therethrough along a third direction substantially orthogonal to the first direction and the second direction;
an ultraviolet light emitting unit provided on at least one of the pair of first opposite side portions and configured to emit ultraviolet light toward the ventilation space; and
first reflecting surfaces respectively provided on the pair of first opposite side portions so as to face each other, each first reflecting surface being concave such that a center thereof in the third direction bulges to outside of the ventilation space, the first reflecting surfaces being configured to reflect the ultraviolet light,
in which a length of the ventilation space in the third direction is shorter than a length of the ventilation space in the first direction and a length of the ventilation space in the second direction, and
a shape of each first reflecting surface in any cross section perpendicular to the second direction is defined based on an arc having a radius of curvature equal to or larger than a distance between a pair of the first reflecting surfaces.

Advantageous Effects of Invention

According to the invention, it is possible to provide an air sterilization apparatus that is excellent in applicability to a rectangular duct and can effectively irradiate dust, bacteria, viruses, and the like in circulating air with ultraviolet light while preventing an increase in blowing resistance, and an air conditioner using the same.

Problems, configurations, and effects other than those described above will be apparent from the following description of embodiments.

DESCRIPTION OF EMBODIMENTS

Hereinafter, embodiments of the invention will be described with reference to the drawings.

First Embodiment

Figure 1:
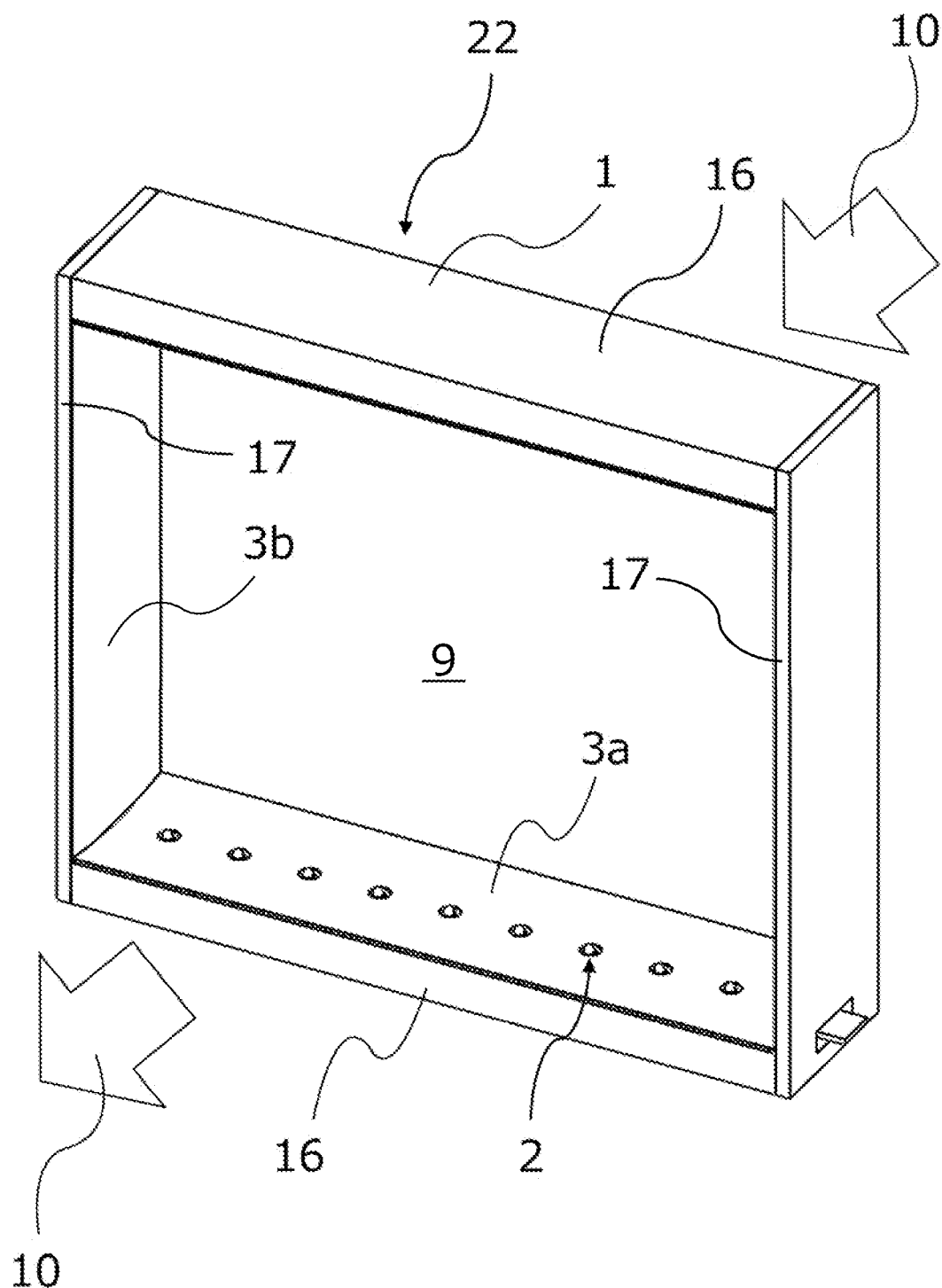
FIG. 1 is a perspective view of an air sterilization apparatus according to a first embodiment of the invention.
Figure 2:
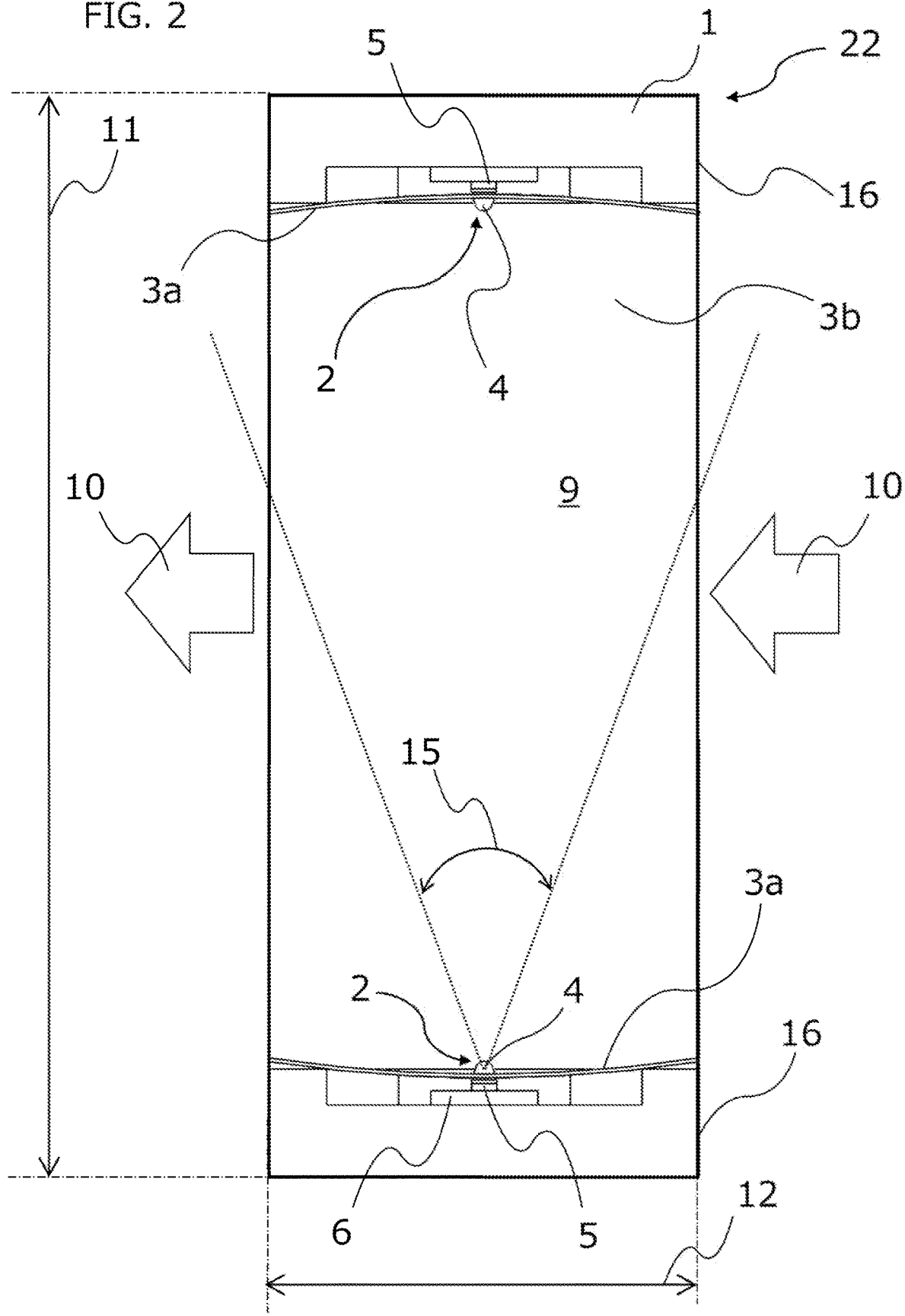
FIG. 2 is a cross-sectional view in a width direction of the air sterilization apparatus according to the first embodiment of the invention.
Figure 3:
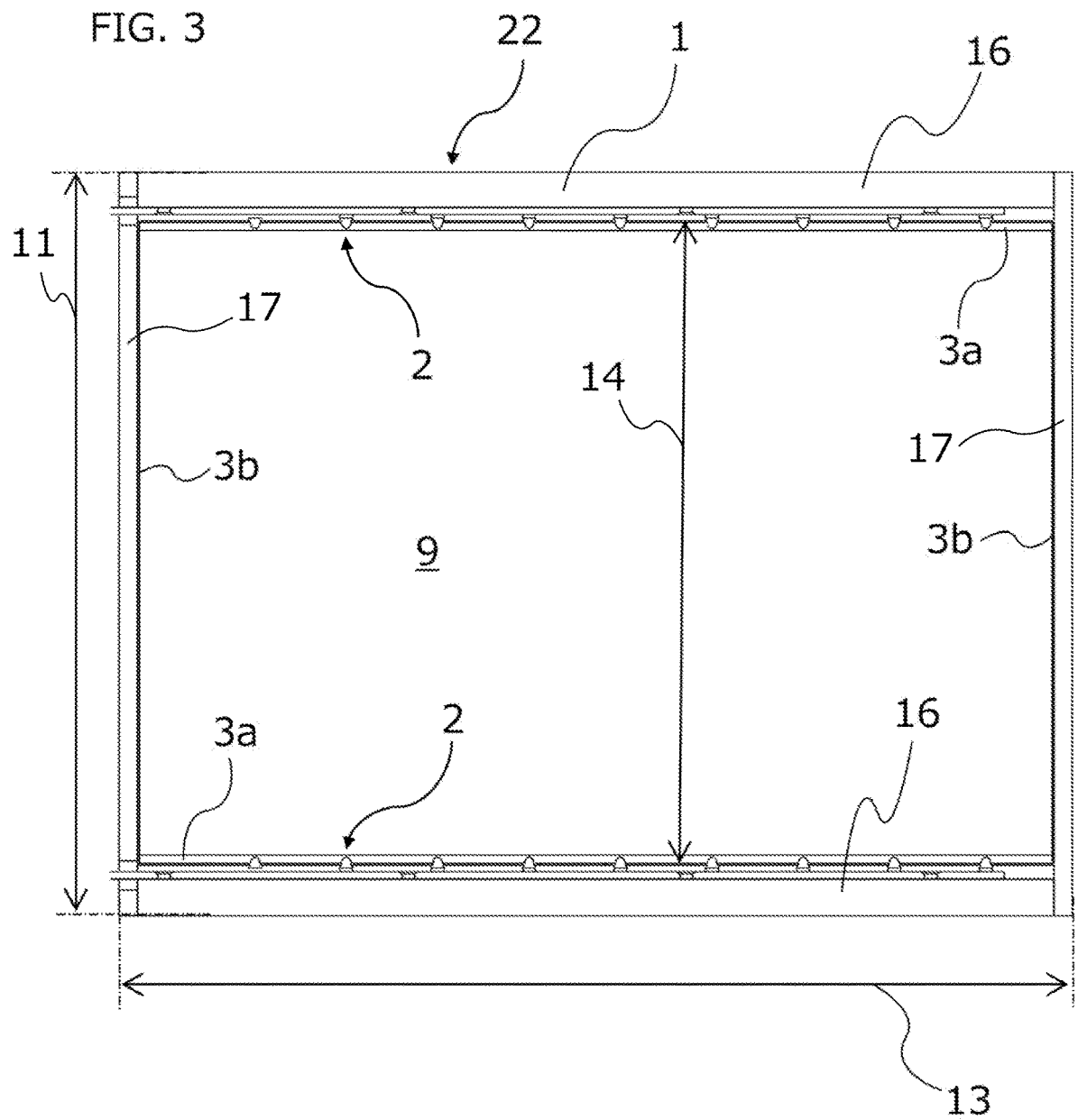
FIG. 3 is a cross-sectional view in a depth direction of the air sterilization apparatus according to the first embodiment of the invention.
Figure 5:
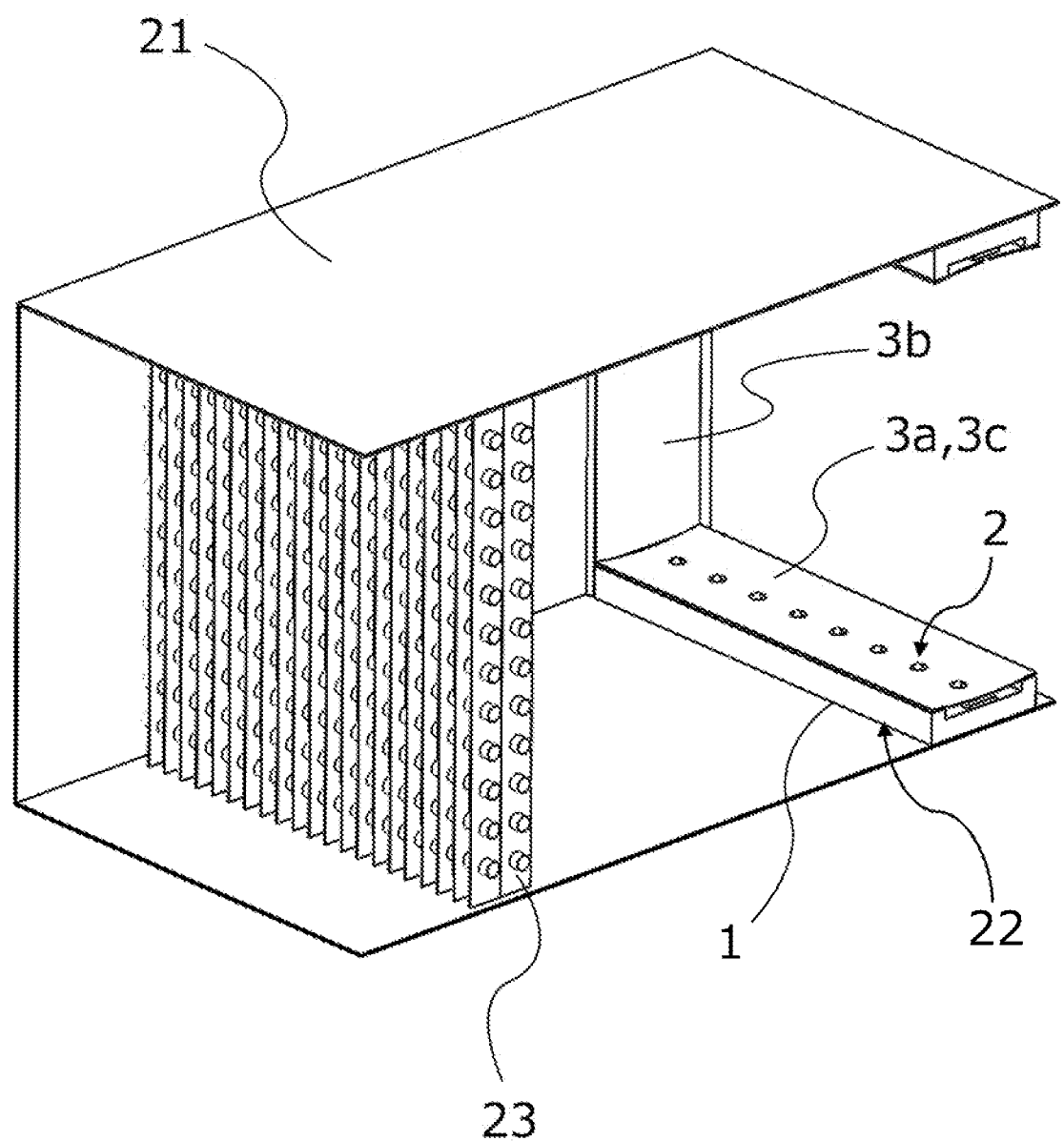
FIG. 5 is a cross-sectional perspective view showing a mounting state of the air sterilization apparatus according to each of the first and second embodiments of the invention.

A first embodiment of the invention will be described with reference to FIGS. 1, 2, 3, and 5. FIG. 1 is a perspective view of an air sterilization apparatus according to the first embodiment. FIGS. 2 and 3 are views showing a cross-sectional structure of the air sterilization apparatus. FIG. 5 is a cross-sectional perspective view showing a state in which the air sterilization apparatus is mounted on an air conditioning duct. However, the invention is not limited to these embodiments.

As shown in FIGS. 1 to 3, in an air sterilization apparatus 22 according to the present embodiment, a plurality of ultraviolet light emitting units 2 (ultraviolet LEDs as ultraviolet light sources 5) are mounted inside a rectangular frame 1 at substantially equal intervals along a width direction of the frame 1 (second direction). The frame 1 is formed in a rectangular shape by a pair of first opposite side portions 16 and a pair of second opposite side portions 17. The pair of first opposite side portions 16 are spaced apart from each other in a height direction of the frame 1 (first direction) and extend substantially parallel to each other along the width direction. The pair of second opposite side portions 17 are spaced apart from each other in the width direction of the frame 1 and extend substantially parallel to each other along the height direction. A rectangular plate-shaped ventilation space 9, in which both sides in a depth direction of the frame 1 (third direction) are opened, is defined inside the frame 1 (inside the rectangular frame formed by the pair of first opposite side portions 16 and the pair of second opposite side portions 17). The ventilation space 9 allows air to pass therethrough along the depth direction. The height direction, the width direction, and the depth direction are substantially orthogonal to each other. In FIGS. 2 and 3, a height direction 11, a depth direction 12, and a width direction 13 are indicated by arrows, respectively.

The ultraviolet light emitting unit 2 includes an ultraviolet light source 5 and a condenser lens 4, and the ultraviolet light source 5 can emit ultraviolet light toward the ventilation space 9 of the frame 1 by receiving power from a power source (not shown). An inner peripheral surface of the frame 1 is provided with reflecting surfaces that regularly reflect the ultraviolet light at a high reflectance. That is, first reflecting surfaces 3a are respectively provided on inner surfaces of the pair of first opposite side portions 16, and second reflecting surfaces 3b are respectively provided on inner surfaces of the pair of second opposite side portions 17. The pair of first reflecting surfaces 3a face each other while being spaced apart in the height direction, and the pair of second reflecting surfaces 3b face each other while being spaced apart in the width direction. The ventilation space 9 is defined by the pair of first reflecting surfaces 3a and the pair of second reflecting surfaces 3b. A region of the reflecting surfaces where the ultraviolet light emitting unit 2 is disposed is an opening such that the ultraviolet light from the ultraviolet light emitting unit 2 can be radiated to the ventilation space 9.

The reflecting surfaces have a function of increasing the ultraviolet intensity in the frame 1 by repeatedly reflecting the ultraviolet light emitted from the ultraviolet light emitting units 2 toward the inside of the frame 1 (the ventilation space 9). In the ultraviolet sterilization apparatus in which a length of the ventilation space 9 in the depth direction is sufficiently large, even when a diffuse reflecting surface is used as the reflecting surface, it is possible to prevent generation of ultraviolet light that leaks to the outside of the frame 1 and does not contribute to sterilization. However, if the ultraviolet light can be controlled using characteristics of regular reflection, leakage of the ultraviolet light to the outside of the frame 1 can be prevent even when the length of the ventilation space 9 in the depth direction is reduced. In the present embodiment, in order to control the ultraviolet light, a surface on which the ultraviolet light sources 5 are disposed and a reflecting surface that is a surface facing the ultraviolet light sources 5 (the pair of first reflecting surfaces 3a) are arc-shaped reflecting surfaces. A surface on which the ultraviolet light sources 5 are not disposed and a facing surface thereof (the pair of second reflecting surfaces 3b) are flat reflecting surfaces.

As shown in FIG. 2, in the air sterilization apparatus 22 according to the present embodiment, the ultraviolet light emitting units 2 are mounted on both surfaces (the pair of first reflecting surfaces 3a) facing each other in the height direction. The ultraviolet light emitting units 2 are fixed to the first opposite side portions 16. As indicated by arrows in an air flow direction 10, the air flows in the ventilation space 9 in the depth direction. The length of the ventilation space 9 in the depth direction is smaller than a length of the ventilation space 9 in the height direction and a length of the ventilation space 9 in the width direction. That is, the frame 1 has a shape in which a length in an axial direction is small (the length in the depth direction is smaller than lengths in the height direction and the width direction).

This is because a duct of an air conditioner or the like, which allows air to flow therethrough, is provided with a structure such as a heat exchanger or a filter, and in order to avoid interference with such a structure, the air sterilization apparatus 22 mounted in an empty space in the duct preferably has a thin shape with respect to the flow of air. This is also because an increase in blowing resistance can be prevented by reducing a thickness of the frame 1 in the axial direction. In many cases, a rectangular duct having a rectangular tube shape is used as the duct of the air conditioner. This is because a heat exchanger or the like having various rectangular shapes can be easily mounted.

In the present embodiment, the first reflecting surfaces 3a are respectively provided on inner sides of upper and lower surfaces of the frame 1 in the height direction (inner surfaces of the pair of first opposite side portions 16). The first reflecting surface 3a is a mirror surface (arc-shaped reflecting surface) having an arc-shaped curved surface in cross section. An ultraviolet LED is attached as the ultraviolet light source 5 to a back surface side of the first reflecting surface 3a, and the condenser lens 4 is attached to the ultraviolet LED 5. The condenser lens 4 is exposed to the ventilation space 9 through the opening. The second reflecting surfaces 3b are provided on planes in a depth direction of a sheet of FIG. 2 (inner surfaces of the pair of second opposite side portions 17). The second reflecting surface 3b is a planar mirror surface (flat reflecting surface).

The ultraviolet LED generally emits ultraviolet light having a light distribution angle approximate to 100°. The ultraviolet light emitted from the ultraviolet light source 5 travels through the ventilation space 9 while spreading toward the facing surface at a predetermined light distribution angle. At this time, when a width of the ultraviolet light is larger than a depth dimension of the ventilation space 9 before reaching the facing surface, the ultraviolet light leaks to the outside of the frame 1 in the depth direction. In the ultraviolet LED, power of ultraviolet light tends to be large in the vicinity of a center in a radiation direction and small on an outer side. For example, when a ratio of an angle of the ultraviolet light that does not leak to a total light distribution angle is 80%, the power of the ultraviolet light included in the light distribution angle of 80% is larger than 80% of a total light amount. Therefore, it is allowable that the ultraviolet light on the outer side leaks to some extent, but it is preferable that the leakage is as small as possible.

Therefore, in the present embodiment, the condenser lens 4 that reduces (narrows) a light distribution angle of the ultraviolet light emitted from the ultraviolet light source 5 is provided in the ultraviolet light emitting unit 2. By using the condenser lens 4, a light distribution angle of the ultraviolet light emitted from the ultraviolet light emitting unit 2 to the ventilation space 9 is reduced to half or less of the light distribution angle of the ultraviolet light emitted from the ultraviolet light source 5, and spread of the ultraviolet light when reaching the facing surface is limited, thereby achieving both reduction of the depth dimension of the frame 1 and prevention of the leakage of the ultraviolet light to the outside of the frame 1. In FIG. 2, the light distribution angle of the ultraviolet light emitted from the condenser lens 4 is indicated by a reference numeral 15.

When a flat reflecting surface is used as a surface facing the ultraviolet light source 5, ultraviolet light emitted at a certain light distribution angle and reflected by the flat reflecting surface further spreads to the outside of the frame 1 in the depth direction and leaks from the air sterilization apparatus 22.

Therefore, in the present embodiment, the reflecting surface that is the surface facing the ultraviolet light source 5 (the first reflecting surface 3a) is an arc-shaped reflecting surface. When the ultraviolet light is reflected by the arc-shaped reflecting surface, the light is condensed toward a center side of the frame 1 in the depth direction at a light distribution angle (including a case where the light distribution angle is 0°) or a convergence angle, which is the same as or smaller than the light distribution angle of the ultraviolet light emitted from the ultraviolet light emitting unit 2. Therefore, the reflected ultraviolet light does not spread to the outside in the depth direction or leak from the air sterilization apparatus 22, and can be continuously reflected in the frame 1. Actually, an amount of ultraviolet light decreases due to attenuation caused by air or attenuation caused by a reflectance of the reflecting surface, but by selecting a reflecting surface having a particularly high reflectance, it is possible to maintain a large amount of light that can be continuously reflected in the frame 1.

The arc-shaped reflecting surface is a curved surface having an arc-shaped cross section, which is concave such that a center in the depth direction bulges to the outside of the ventilation space 9 in an ultraviolet radiation direction of the frame 1 and which has a radius of curvature equal to or larger than a distance between the surface provided with the ultraviolet light sources 5 and the surface facing the ultraviolet light sources 5 (a distance between the pair of first reflecting surfaces 3*a*). That is, the first reflecting surface 3*a* is a surface whose shape in any cross section perpendicular to the width direction is defined along (that is, based on) an arc having a radius of curvature equal to or larger than the distance between the pair of first reflecting surfaces 3*a*, and in the present embodiment, the first reflecting surface 3*a* is an arc-shaped reflecting surface curved along the arc. A center of the arc is set within a plane that passes through a center of the first reflecting surface 3*a* in the depth direction and is perpendicular to the depth direction. When the radius of curvature of the arc-shaped reflecting surface is set to be equal to the distance between the pair of first reflecting surfaces 3*a*, the ultraviolet light reflected by the arc-shaped reflecting surface is focused in the vicinity of a surface of the facing surface, and thus an amount of ultraviolet light leaking to the outside of the frame 1 can be further limited. On the other hand, when the radius of curvature of the arc-shaped reflecting surface is set to be smaller than the distance between the pair of first reflecting surfaces 3*a*, the ultraviolet light leaks to the outside in the depth direction of the frame 1 while being continuously reflected between the facing surfaces. In FIG. 3, the distance between the first reflecting surfaces 3*a* is indicated by a reference numeral 14.

With these configurations, the ultraviolet light emitted from the ultraviolet light source 5 can be repeatedly reflected in the frame 1 while limiting the amount of light leaking to the outside of the frame 1, and an ultraviolet density inside the frame 1 (ventilation space 9) can be increased.

The ultraviolet light emitted from the ultraviolet light source 5 is particularly referred to as deep ultraviolet light having a wavelength of approximately 200 nm to 300 nm, and is emitted to bacteria, viruses, and the like, thereby destroying proteins that are formation substances thereof. Therefore, it is possible to inactivate bacteria, viruses, and the like by applying the ultraviolet light having the wavelength of approximately 200 nm to 300 nm thereto.

Although an amount of energy required to inactivate bacteria, viruses, and the like varies depending on a wavelength of the ultraviolet light, it is possible to inactivate the bacteria, viruses, and the like by applying a predetermined amount of ultraviolet light having any wavelength between 200 nm and 300 nm. Currently, a product that outputs ultraviolet light having a wavelength of 280 nm has been marketed as an ultraviolet LED that emits deep ultraviolet light, and in particular, in the present embodiment, it is assumed that the ultraviolet LED having a wavelength of 280 nm or less is mounted.

In order to inactivate bacteria, viruses, and the like by irradiation with ultraviolet light having a certain energy, it is necessary to ensure an ultraviolet density and irradiation time, but it is difficult to ensure the irradiation time in an irradiation space that is in flowing air and has no thickness in a flow direction, and thus it is important to increase the ultraviolet density.

FIG. 3 is a cross-sectional view of the air sterilization apparatus 22 shown in FIG. 1 taken along a cross section perpendicular to the depth direction. As shown in FIG. 3, in the present embodiment, the plurality of ultraviolet light emitting units 2 are arranged side by side along the width direction on upper and lower inner surfaces of the frame 1 shown in the drawing (the inner surfaces of the pair of first opposite side portions 16). Substantially the entire region of the inner peripheral surface of the frame 1 serves as reflecting surfaces, and in particular, a surface that emits ultraviolet light and a surface facing the surface (the pair of first reflecting surfaces 3*a*) are arc-shaped reflecting surfaces. Flat reflecting surfaces are applied to left and right inner surfaces (the pair of second reflecting surfaces 3*b*) of the frame 1 on which the ultraviolet light emitting units 2 are not disposed (not shown).

In the present embodiment, a position of the ultraviolet light emitting unit 2 disposed on the upper surface (one first reflecting surface 3*a*) and a position of the ultraviolet light emitting unit 2 disposed on the lower surface (the other first reflecting surface 3*a*) face each other, but a reflectance of the ultraviolet light is increased when the positions are slightly shifted. This is because an emitting portion (ultraviolet light emitting unit 2) of the ultraviolet light source 5 is not covered with the reflecting surface and is an opening that does not reflect the ultraviolet light. In particular, a central portion of the ultraviolet light emitted from the ultraviolet light source 5 often has large light power. This is because loss increases when the central portion overlaps with the ultraviolet light emitting unit 2 (opening) of the facing surface. The position of the ultraviolet light emitting unit 2 on the upper surface and the position of the ultraviolet light emitting unit 2 on the lower surface may be shifted in one or both of the width direction and the depth direction of the frame 1.

In the present embodiment, the ultraviolet light sources 5 are disposed only on the upper and lower surfaces (first reflecting surfaces 3*a*), and may be disposed also on the left and right surfaces (second reflecting surfaces 3*b*). In this case, it is necessary to apply arc-shaped reflecting surfaces as reflecting surfaces of the left and right surfaces (second reflecting surfaces 3*b*). On the other hand, when the ultraviolet light sources 5 are not disposed on the left and right surfaces as in the present embodiment, the left and right reflecting surfaces can be flat plates, which have a low manufacturing cost. Moreover, since there are no components such as the ultraviolet light sources 5, a thickness of the frame 1 on the left and right surfaces can be reduced, which contributes to reducing ventilation resistance in the frame 1.

It has been described above that the ultraviolet light source 5 has a constant light distribution angle, but in the width direction, this light distribution angle contributes to spreading the ultraviolet light to the entire region in the frame 1. That is, when the light distribution angle is very small, a place where the ultraviolet light is not applied is created in the frame 1, which causes bacteria or viruses that cannot be sterilized at a certain ratio.

As in the present embodiment, when the arc-shaped reflecting surface having a curved surface only along the depth direction is disposed in parallel with a surface facing a surface on which the ultraviolet light source 5 is disposed, the ultraviolet light can be converged inward in the depth direction in which a distance is short and leakage to the outside in the depth direction can be prevented, and in addition, the ultraviolet light can be uniformly applied to the entire region inside the frame 1 using the spread of light, which is a light distribution angle from the ultraviolet light emitting unit 2, in the width direction.

As shown in FIG. 5, the air sterilization apparatus 22 according to the present embodiment is mounted in a rectangular air conditioning duct 21 in which devices such as a heat exchanger 23 are mounted. The air sterilization apparatus 22 is disposed and fixed inside the air conditioning duct 21 such that an outer peripheral surface (four outer surfaces) of the frame 1 extends along an inner peripheral surface (four inner surfaces) of the air conditioning duct 21. The outer peripheral surface of the frame 1 is in contact with or in proximity to the inner peripheral surface of the air conditioning duct 21. In particular, as shown in FIG. 5, when the air sterilization apparatus 22 is disposed immediately in front of and/or immediately behind the heat exchanger 23, the ultraviolet light leaking in the depth direction of the air sterilization apparatus 22 can be applied to sterilization of a surface of the heat exchanger 23.

A resin or iron, which is a material of a general duct, does not have a high reflectance of ultraviolet light. A reflectance of pure aluminum, which has a high reflectance of ultraviolet light, is not high either due to surface treatment and coating. Therefore, when there is a distance between the heat exchanger 23 and the air sterilization apparatus 22, power of the ultraviolet light leaking from the air sterilization apparatus 22 is not large in the first place, and is further attenuated before reaching the heat exchanger 23 while being reflected by a surface of the duct. However, as in the present embodiment, the air sterilization apparatus 22 that is thin in the depth direction is highly likely to be disposed immediately in front of or immediately behind the heat exchanger 23, and thus the ultraviolet light leaking from the air sterilization apparatus 22 can be applied to the heat exchanger 23 with relatively large power.

The heat exchanger 23 includes fins and a pipe that allows a refrigerant to pass therethrough, and heats and cools air when the air flows between the fins. Although large dust such as dirt is removed from the air by a filter, fine dust, mold, bacteria, viruses, and the like reach the heat exchanger 23, and a part thereof adheres to the surface of the heat exchanger 23. The dust and mold adhering to the surface of the heat exchanger 23 may cause an odor of air after the air passes through the heat exchanger 23. Therefore, the odor can be prevented as long as growth of the mold is inhibited by applying the ultraviolet light. Although dust is particularly likely to be accumulated on a front edge portion of the fin, when the air sterilization apparatus 22 is disposed immediately in front of the heat exchanger 23 such that the ultraviolet light is applied to the front edge portion, it is possible to decompose a component made of a polymer among the accumulated dust and to inhibit accumulation and growth of dust.

Although not shown, when the air sterilization apparatus 22 according to the present embodiment is disposed in the vicinity of a filter instead of the heat exchanger 23, mold, bacteria, and viruses adhering to a surface of the filter can be reduced.

Second Embodiment

Figure 4:
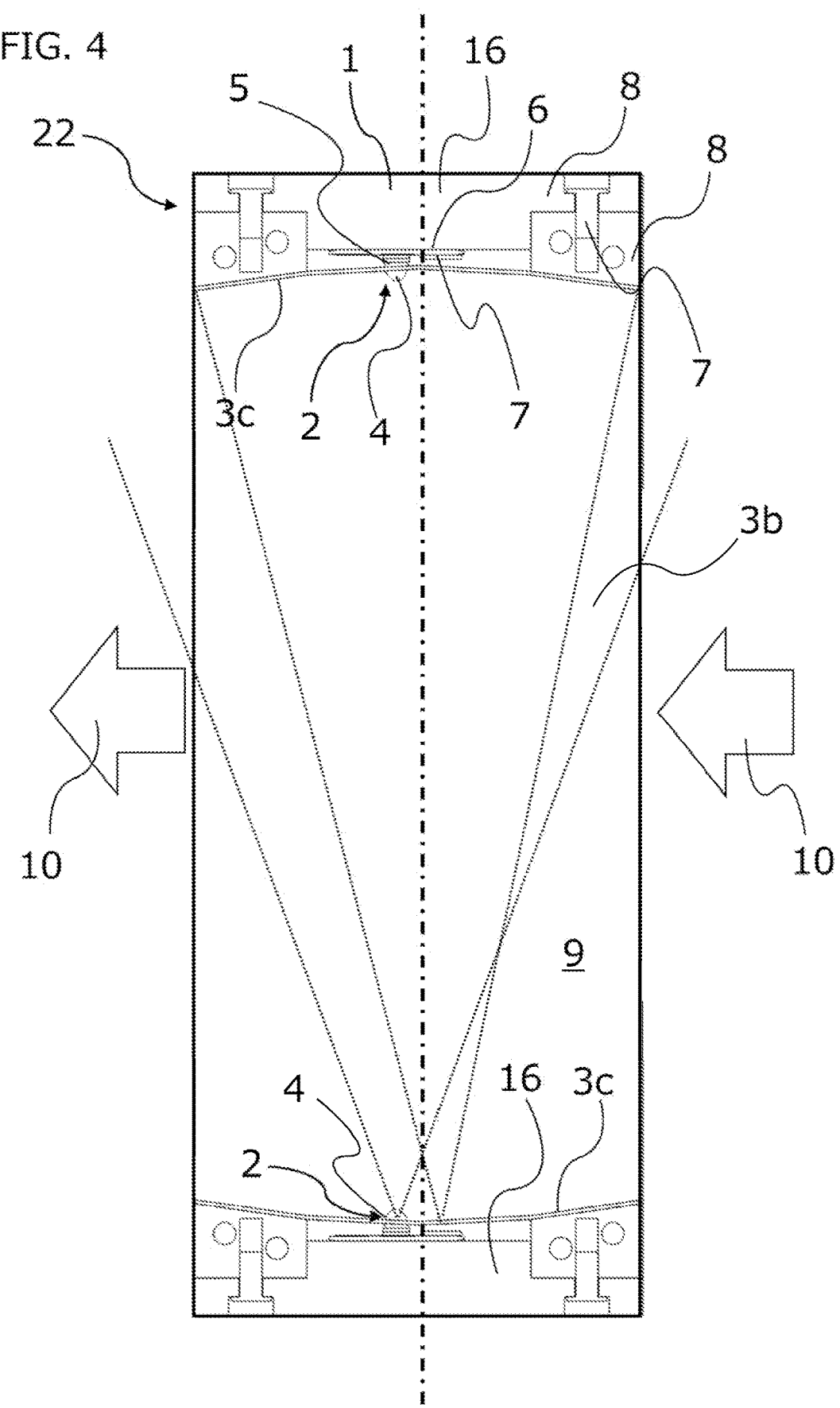
FIG. 4 is a cross-sectional view in a width direction of an air sterilization apparatus according to a second embodiment of the invention.

A second embodiment of the invention will be described with reference to FIG. 4. FIG. 4 is a cross-sectional view in a width direction of an air sterilization apparatus according to the second embodiment. However, the invention is not limited to these embodiments.

As shown in FIG. 4, in the air sterilization apparatus 22 according to the present embodiment, a polygonal curved reflecting surface is applied to a first reflecting surface 3c instead of the arc-shaped reflecting surface according to the first embodiment shown in FIG. 2. The polygonal curved reflecting surface is a mirror surface of a polygonal curved surface (polygonal surface along a depth direction), which is concave such that a center thereof in the depth direction bulges to the outside of the frame 1 (ventilation space 9), whose shape in any cross section perpendicular to a width direction is defined (that is, based on) along an arc (including a straight line) having a radius of curvature equal to or larger than a distance between a pair of first reflecting surfaces 3c, and which includes a plurality of flat surfaces inscribed or circumscribed to the arc. The polygonal curved reflecting surface is set between a cylindrical surface having a radius equal to a distance between a radiation surface of the ultraviolet light source 5 and a surface facing the radiation surface, and a cylindrical surface having a radius larger than the radius. Accordingly, similarly to the arc-shaped reflecting surface according to the first embodiment, it is possible to prevent ultraviolet light from leaking to the outside of the frame 1 in the depth direction.

A center of the radius of curvature of each of the polygonal reflecting surface according to the present embodiment and the arc-shaped reflecting surface shown in the first embodiment coincides with a center of the frame 1 in the depth direction. In the present embodiment, a position of the ultraviolet light source 5 is shifted with respect to a center position of the frame 1 in the depth direction (the ultraviolet light emitting unit 2 is spaced apart in the depth direction from a center position of the first reflecting surface 3c in the depth direction). A position of the facing ultraviolet light source 5 may be shifted to an opposite side in the depth direction.

With such an arrangement, the ultraviolet light emitted from the ultraviolet light emitting unit 2 is reflected by the facing reflecting surface, and then condensed at a position line-symmetrical to a light emitting point with respect to a center line in the depth direction. Accordingly, the condensed light can be prevented from irradiating a non-reflecting portion (opening) opened for the ultraviolet light source 5, and reflection efficiency can be increased.

When an offset amount (an amount of shift in the depth direction) of the ultraviolet light emitting unit 2 is too large, an amount of light leaking to the outside of the frame 1 in the depth direction increases before the ultraviolet light emitted from the ultraviolet light source 5 reaches the facing reflecting surface, and thus the efficiency decreases. Therefore, a minimum offset amount for avoiding the opening of the ultraviolet light emitting unit 2 is desirable. That is, when a size of the opening is determined by an LED size of the ultraviolet light source 5 (a dimension of the ultraviolet light emitting unit 2 in the depth direction), the offset amount is preferably equal to or slightly larger than the size of the opening.

As shown in FIG. 4, the ultraviolet light emitting unit 2 includes the ultraviolet light source (ultraviolet LED) 5 and the condenser lens 4. In the present embodiment, in order to supply power to the ultraviolet LED 5, the ultraviolet LED 5 is attached to a substrate 6, and the substrate 6 is fixed to a metal block 8 by a screw 7. The metal block 8 is connected to the first reflecting surface 3c via a metal component such as the screw 7 in a thermally conductive manner. The first reflecting surface 3c is also preferably made of metal. By adopting such a configuration, it is possible to prevent a rise in temperature of the ultraviolet LED 5 due to heat generation of the LED. That is, heat generated by the ultraviolet LED 5 is transmitted to the first reflecting surface 3c via the metal component, and air flows on the reflecting surface, whereby the heat can be radiated to the air. In particular, a GND terminal of the ultraviolet LED 5 and a GND portion of the substrate 6 are appropriately designed such that the heat is transferred to the metal block 8 via the screw 7, whereby a heat dissipation effect can be improved. When the temperature of the ultraviolet LED 5 is too high, problems such as a failure or shortening of life occur. Therefore, lowering the temperature is directly linked to the life of the ultraviolet LED 5 and the life of the air sterilization apparatus 22. Therefore, a structure of the present embodiment contributes to extending the life of the air sterilization apparatus 22.

According to the invention, the ultraviolet light is emitted using the ultraviolet LED having a relatively long life and low cost, and the ultraviolet light is repeatedly reflected in the ventilation space in the frame, whereby the ultraviolet density in the ventilation space can be increased. Since the leakage of light in the depth direction of the frame can be prevented by reflection of the reflecting surface concave to the outside of the ventilation space, emission of the ultraviolet light to the outside of the frame can be prevented even when the thickness (length in the depth direction) of the frame is small. The frame has a rectangular shape, which is suitable for mounting on the rectangular duct. With such a configuration, it is possible to provide an air sterilization apparatus that is excellent in applicability to a rectangular duct and can be mounted in a narrow space in the air conditioning duct while preventing an increase in blowing resistance.

The invention is not limited to the embodiments described above, and includes various modifications. For example, the embodiments described above have been described in detail for easy understanding of the invention, and the invention is not necessarily limited to those including all the configurations described above. A part of the configuration of one embodiment may be replaced with the configuration of another embodiment, and the configuration of another embodiment may be added to the configuration of one embodiment. In addition, a part of the configuration of each embodiment may be added to, deleted from, or replaced with another configuration.

REFERENCE SIGNS LIST

1: frame
2: ultraviolet light emitting unit
3a: first reflecting surface (arc-shaped reflecting surface)
3b: second reflecting surface (flat reflecting surface)
3c: first reflecting surface (polygonal curved reflecting surface)
4: condenser lens
5: ultraviolet light source (ultraviolet LED)
6: substrate
7: screw
8: metal block
9: ventilation space
10: air flow direction
11: height direction (first direction)
12: depth direction (air flow direction, third direction)
13: width direction (second direction)
14: distance between first reflecting surfaces
15: light distribution angle
16: first opposite side portion
17: second opposite side portion
21: air conditioning duct
22: air sterilization apparatus
23: heat exchanger

The invention claimed is:

1. An air sterilization apparatus comprising:
a rectangular frame including a pair of first opposite side portions spaced apart from each other in a first direction and extending along a second direction, and a pair of second opposite side portions spaced apart from each other in the second direction and extending along the first direction, a ventilation space being defined inside the frame, the ventilation space allowing air to flow therethrough along a third direction substantially orthogonal to the first direction and the second direction;
an ultraviolet light emitting unit provided on at least one of the pair of first opposite side portions and configured to emit ultraviolet light toward the ventilation space; and
first reflecting surfaces respectively provided on the pair of first opposite side portions so as to face each other, each first reflecting surface being concave such that a center thereof in the third direction bulges to outside of the ventilation space, the first reflecting surfaces being configured to reflect the ultraviolet light, wherein
a length of the ventilation space in the third direction is shorter than a length of the ventilation space in the first direction and a length of the ventilation space in the second direction, and
a shape of each first reflecting surface in any cross section perpendicular to the second direction is defined based on an arc having a radius of curvature equal to or larger than a distance between a pair of the first reflecting surfaces.

2. The air sterilization apparatus according to claim 1, wherein
each first reflecting surface is a mirror surface that regularly reflects the ultraviolet light.

3. The air sterilization apparatus according to claim 1, wherein
the ultraviolet light emitting unit includes an ultraviolet light source that emits the ultraviolet light, and a condenser lens that reduces a light distribution angle of the ultraviolet light emitted from the ultraviolet light source.

4. The air sterilization apparatus according to claim 1, wherein
the ultraviolet light emitting unit is spaced apart in the third direction from center positions of the first reflecting surfaces in the third direction, and
a distance between the ultraviolet light emitting unit and the center position is equal to or larger than a dimension of the ultraviolet light emitting unit in the third direction.

5. The air sterilization apparatus according to claim 1, wherein
each first reflecting surface is a curved surface having an arc-shaped cross section along the arc.

6. The air sterilization apparatus according to claim 1, wherein
each first reflecting surface is a polygonal curved surface including a plurality of flat surfaces inscribed or circumscribed to the arc.

7. The air sterilization apparatus according to claim 1, further comprising:
a pair of second reflecting surfaces respectively provided on the pair of second opposite side portions so as to face each other, and configured to reflect the ultraviolet light.

8. The air sterilization apparatus according to claim 1, wherein
the ultraviolet light emitting unit is attached to a substrate, and
the substrate is connected to the first reflecting surfaces via a metal.

9. An air conditioner comprising: the air sterilization apparatus according to claim 1 in an air conditioning duct, wherein
the air conditioning duct is a rectangular duct having a rectangular flow path cross section, and
the air sterilization apparatus is disposed inside the air conditioning duct such that an outer peripheral surface of the frame extends along an inner peripheral surface of the air conditioning duct.

* * * * *